(No Model.) 6 Sheets—Sheet 1.

J. C. GOODRIDGE, Jr.
APPARATUS FOR ERECTING AND SUPPORTING COLOSSAL STRUCTURES.

No. 289,644. Patented Dec. 4, 1883.

WITNESSES:

INVENTOR:
J. C. Goodridge Jr.
BY
ATTORNEYS.

(No Model.)  
6 Sheets—Sheet 2.

J. C. GOODRIDGE, Jr.
APPARATUS FOR ERECTING AND SUPPORTING COLOSSAL STRUCTURES.

No. 289,644. Patented Dec. 4, 1883.

WITNESSES:

INVENTOR:
J. C. Goodridge Jr
BY
ATTORNEYS.

(No Model.) 6 Sheets—Sheet 3.

J. C. GOODRIDGE, Jr.
APPARATUS FOR ERECTING AND SUPPORTING COLOSSAL STRUCTURES.

No. 289,644. Patented Dec. 4, 1883.

WITNESSES: INVENTOR:
J. C. Goodridge Jr.
BY
ATTORNEYS.

(No Model.) 6 Sheets—Sheet 4.
J. C. GOODRIDGE, Jr.
APPARATUS FOR ERECTING AND SUPPORTING COLOSSAL STRUCTURES.
No. 289,644. Patented Dec. 4, 1883.
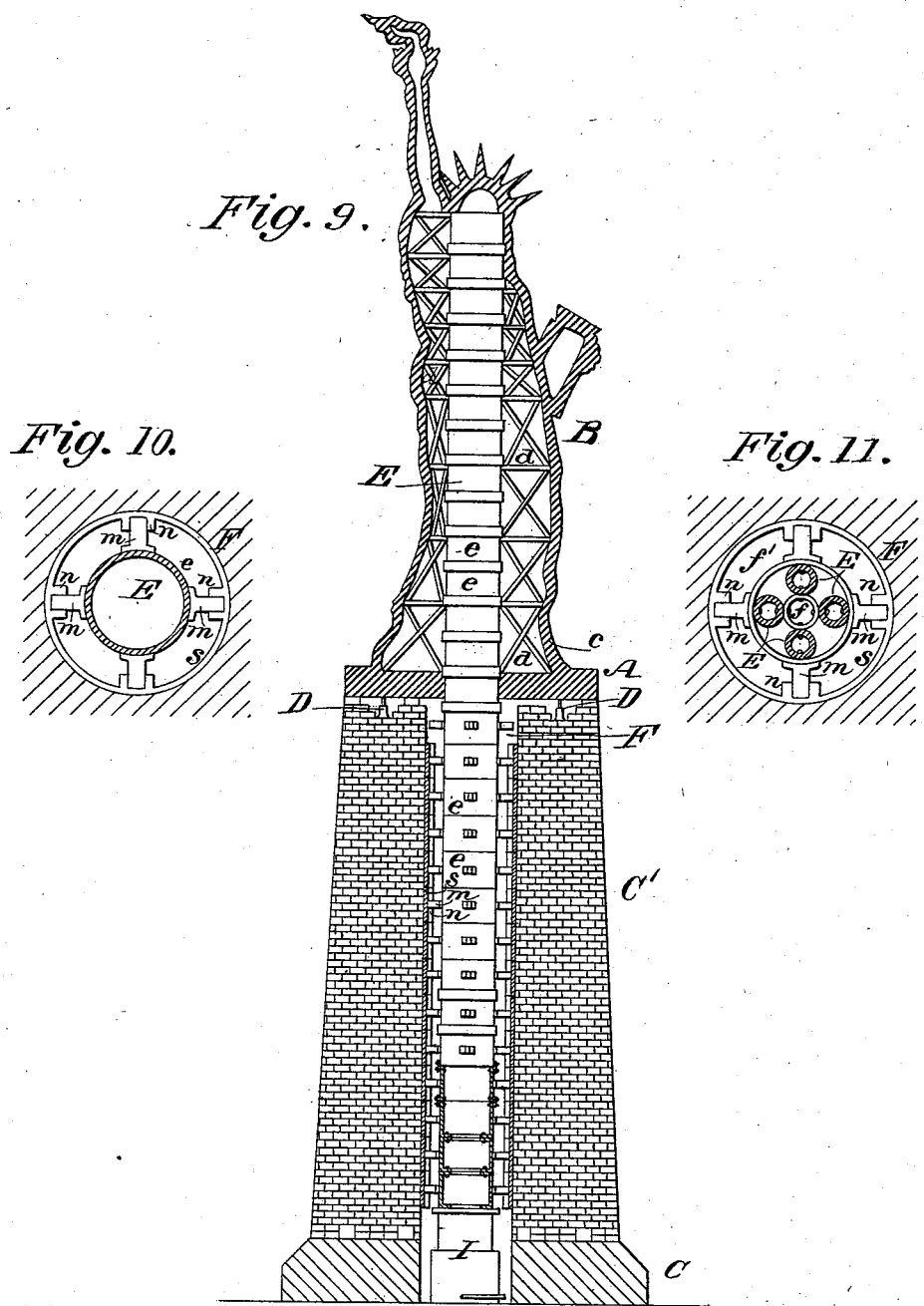
WITNESSES:
INVENTOR:
J. C. Goodridge Jr
BY
ATTORNEYS.

(No Model.) 6 Sheets—Sheet 5.

J. C. GOODRIDGE, Jr.
APPARATUS FOR ERECTING AND SUPPORTING COLOSSAL STRUCTURES.

No. 289,644. Patented Dec. 4, 1883.

WITNESSES:

INVENTOR:
BY
ATTORNEYS.

(No Model.) 6 Sheets—Sheet 6.

J. C. GOODRIDGE, Jr.
APPARATUS FOR ERECTING AND SUPPORTING COLOSSAL STRUCTURES.

No. 289,644. Patented Dec. 4, 1883.

WITNESSES:

INVENTOR:
J. C. Goodridge Jr.
BY
ATTORNEYS.

UNITED STATES PATENT OFFICE.

JOHN C. GOODRIDGE, JR., OF NEW YORK, N. Y.

APPARATUS FOR ERECTING AND SUPPORTING COLOSSAL STRUCTURES.

SPECIFICATION forming part of Letters Patent No. 289,644, dated December 4, 1883.

Application filed April 28, 1883. (No model.)

*To all whom it may concern:*

Be it known that I, JOHN C. GOODRIDGE, Jr., of the city, county, and State of New York, have invented a new and Improved Method and Apparatus for the Erection and Support of Colossal Statues, Bridges and other Structures, of which the following is a full, clear, and exact description.

This invention relates to the erecting and supporting of colossal statues or monuments and other structures by intermittently lifting and steadying or leveling the statue or structure by power applied progressively to its foundation as the same is built up under it; and the invention consists in special means for accomplishing the same and for strengthening and supporting the structure, substantially as hereinafter described.

Reference is to be had to the accompanying drawings, forming part of this specification, in which similar letters of reference indicate corresponding parts in all the figures.

Figure 1:
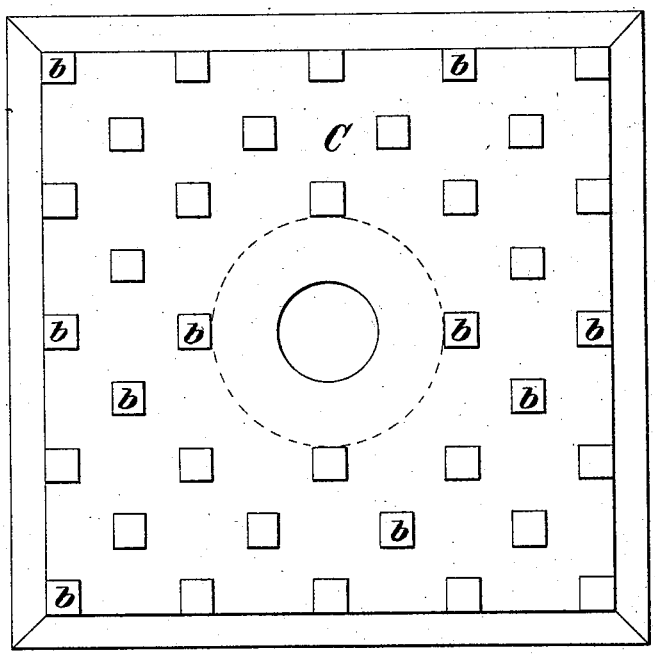
Figure 2:
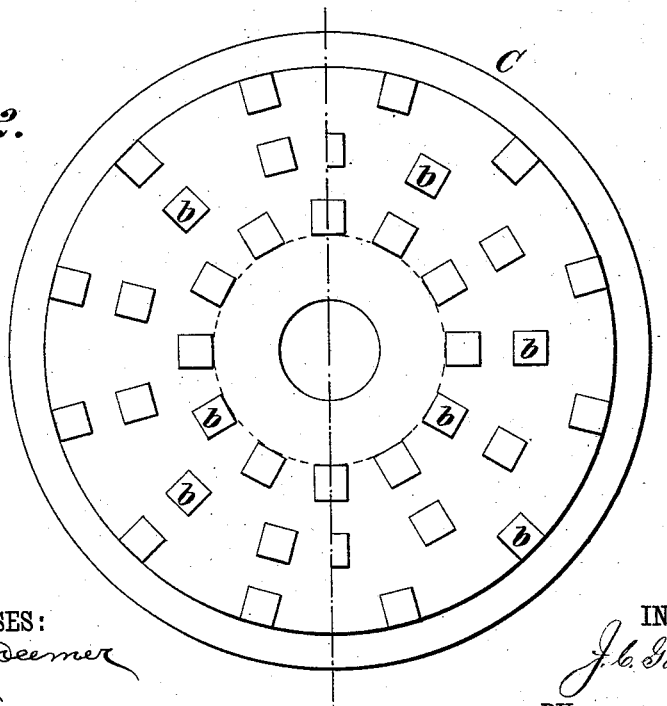
Figure 6:
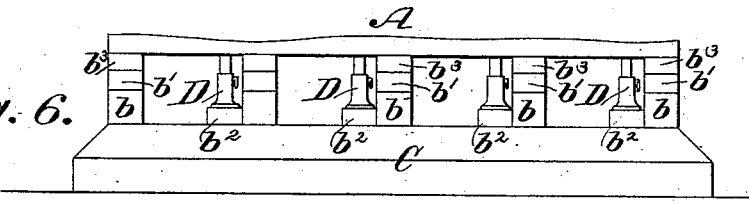
Figure 7:
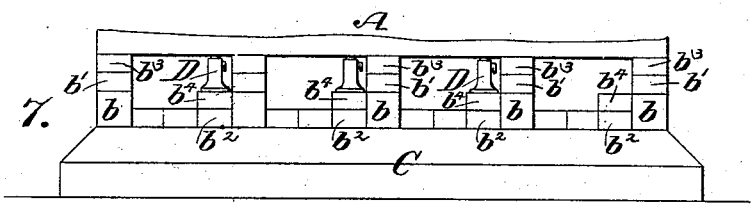
Figure 8:
Figure 12:
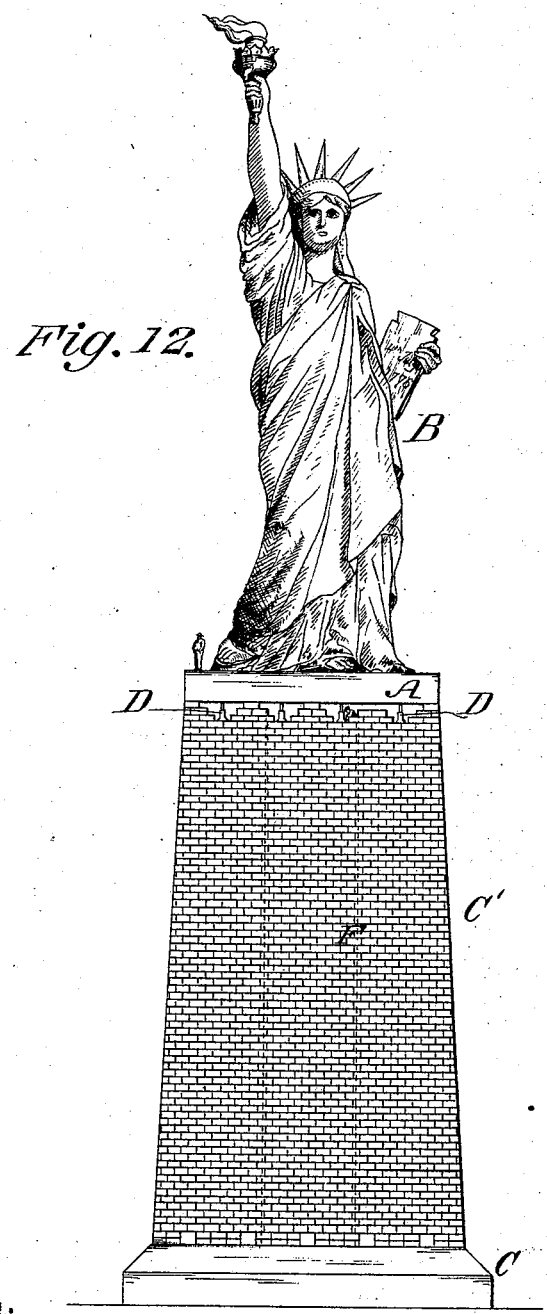
Figure 15:
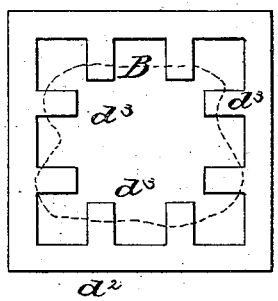
Figure 13:
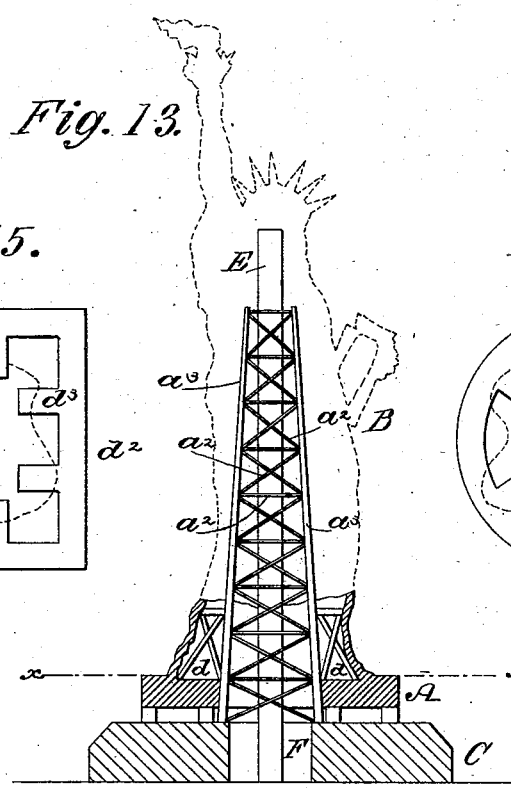
Figure 16:
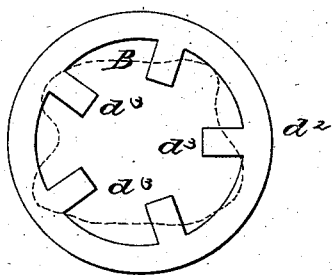
Figure 14:
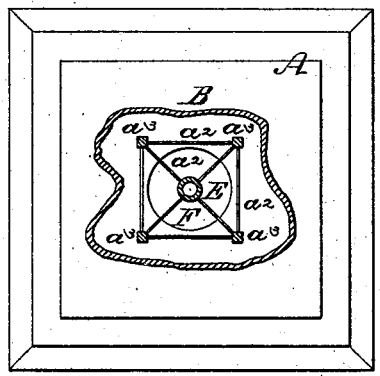

Figure 1 represents a plan view of the base of a pedestal or pier foundation for the support of a colossal statue or other structure when said base is of square shape, said view also showing blocks as mounted on the base for erection of the superstructure, and which ultimately form part of the body of the pedestal. Fig. 2 is a plan of the pedestal-base when of round shape, and showing on opposite sides of a dividing dotted line two different arrangements of the blocks which are mounted on the base. Figs. 3, 4, 5, 6, and 7 are side elevations of the base of the pedestal with the statue (only a base portion of which is shown) as being raised by the aid of a series of jacks, also showing the progress of the work as regards the filling in or building up of the pedestal and the manner in which the jacks are used during the same; and Fig. 8 shows a colossal statue as already built, and as resting on the blocks shown in Figs. 1, 2, and 3, and as ready to be raised by the jacks. Figs. 9, 10, 11, and 12 are views in further illustration of my improved method of erecting and supporting a colossal or other structure, and in which said structure is assembled or erected in sections upon the base of the pedestal around a tubular or other column-like internally-attached support, or, it may be, any number of such supports, and the whole afterward intermittently raised, and the body of the pedestal built up under it at each stage of its lift, also of the column-support extended to continue it down within the pedestal. When advisable, a portion—as, for instance, the lower half—of the statue or structure may be raised, as described, and the other portions assembled after the first portion has been raised to the desired height. Fig. 9 is a sectional elevation of the work at a certain stage of its progress. Figs. 10 and 11 are horizontal sections, showing means for guiding the interior column-like support, also different constructions of the same; and Fig. 12 is a view in elevation of the work as about or nearly completed. Fig. 13 is a sectional elevation, showing a modified construction of the interior support to the statue or structure; and Fig. 14 is a horizontal section of the same on the line $x$ $x$ in Fig. 13. Figs. 15 and 16 are horizontal sections or views showing a modified construction of the pedestal of square and rounded form, respectively.

Figure 3:
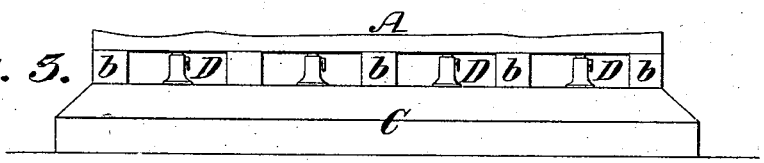
Figure 4:
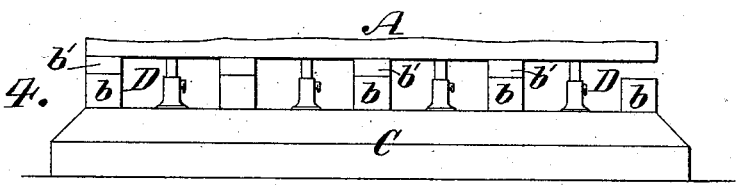
Figure 5:
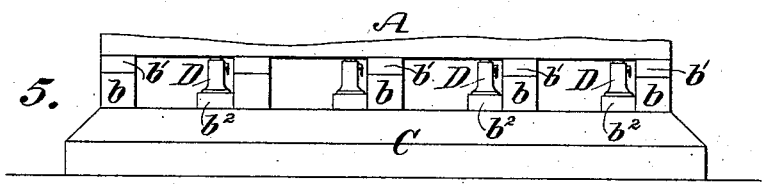

Referring in the first instance to the several figures from 1 to 8, inclusive, A is the base of colossal statue of Liberty, B; or it may be any other structure which it is desired to bodily raise upon a suitable pedestal, pier, or support. C is the base of the pedestal, pier, or support, which may rest upon any suitable sub-foundation. This pedestal or pier virtually forms the foundation of the statue or structure to be mounted upon it. The base A, with its superincumbent statue, is placed upon a series of blocks, $b$, arranged upon the base C of the pedestal. These blocks $b$, which ultimately form component parts of the body of the pedestal, are of sufficient height and placed at suitable distances apart, as shown in Fig. 3, to admit of the introduction between them and under the base A of the statue of any number of screws or hydraulic jacks, D, worked in any suitable manner; or any other kind of lifting-jacks may be used. The statue is then raised by the jacks to the extent of their lift, and additional blocks, $b'$, as shown in Fig. 4, laid or built upon the blocks $b$ to support the statue at said lift. The jacks D are then lowered and placed upon blocks $b^2$, forming part of the lower course of the masonry of the body of the pedestal, as shown in Fig. 5, and the jacks are operated to give the statue another lift, after which other blocks, $b^3$, are cemented upon the blocks $b'$ to hold the statue at such additional lift, as shown in Fig. 6. Following this the jacks D are again lowered and placed upon blocks $b^4$, forming part of a second course of the masonry of the body of the pedestal, as shown in Fig. 7, and the work proceeded with, as before, the pedestal being built up one course after another till the whole is completed, and the statue, figure, or weight raised to its required height, each course or layer of masonry being filled in and finished as the work progresses, as shown for the lower tier, $b^2$, in Fig. 7.

Referring in the next instance to Figs. 9, 10, 11, and 12 of the drawings, the colossal statue B, built up in sections and composed of copper or other metal plates suitably riveted or secured together, is assembled on its foundation as follows: The base A of the statue is first placed in position upon the base C of the pedestal, and arranged to receive up within it one or more metal columns, tubes, or pipes, which may be built up in sections firmly secured together, and united with the base and exterior of the statue and its lining by suitable braces, $d\ d$. Figs. 9 and 10 only show one of such tubes E arranged to extend up within the hollow statue and down within the well-hole F of the pedestal, as will be hereinafter more particularly described, while Fig. 11 shows four of such tubes E arranged around and within and secured to concentric rings $f$ $f'$, thus forming a compound tube that, like the single tube E shown in Fig. 9, may be built up in sections, $e$, of any convenient length.

The base portion A of the statue is placed upon the base C of the pedestal, or, rather, upon blocks $b$ thereon, forming part of the lower course of masonry of the pedestal, and arranged to admit of the jacks D between the bases A C, as hereinbefore described with reference to the figures of the drawings from 1 to 8, inclusive. A series of sections, $e$, of the tubes E are then built up by derrick from the ground or otherwise to the required height of its projection up within the statue, and firmly secured to the base portion of the statue by the braces $d$. The portion of said tube which projects up within the statue may temporarily rest upon a platform arranged to cover the well-hole F, which passes through the base C of the pedestal. After the statue B has been erected and braced, said temporary platform is then removed, and the lifting device for raising the statue, with its attached interior column or tube, placed in position below the tube. This lifting device may be a powerful hydraulic jack, I, Fig. 9, operated by machinery, as it does not require to be moved during the continuance of the work. The other jacks, D, should also then be placed in position upon the base of the pedestal. These jacks D in this case simply act as auxiliaries to the main jack I, and may be made to do the leveling, or take the load in case of the failure of the other appliances, although they may likewise serve to aid the main jack I in the lift of the load, and they are progressively mounted or raised with the pedestal or foundation of the statue as it is built up till reaching the top of the body C' of the pedestal, as shown in Figs. 9 and 12, all as hereinbefore described with reference to the figures from 1 to 8, inclusive, of the drawings. After each lift of the jack I, or jacks I and D combined, the column or tube E, attached to the statue, is extended by placing successively under it a series of additional tubular sections $e$—that is, one or more of such additional sections upon each lowering of the ram of the jack I—when or after which a fresh lift is taken. This operation is continued till the structure or statue has been raised to its proper elevation, and the pedestal or pier built up to correspond.

The lower sections $e$ of the column or tube within the pedestal may have guides or projections $m$ on their exterior, or in the case of the column being a compound one, as shown in Fig. 11, upon the exterior of the rings $f'$. These guides or projections are free to slide up and down within ways $n$ on rings $s$, mounted one upon the other within the well-hole F of the pedestal. These guides and ways assist the raising of the load, and make the alignment more perfect.

When a series of columns or tubes are used, a portion of them may be made to hold the weight while the others are being lengthened.

When the statue is in position, the interior metal column or columns may be left suspended from the statue and its base to add to its weight and lower its center of gravity. The same will also act as a huge dowel-pin or bolt, and the portion near the statue may be made stronger for such purpose; or, if desired, the column can be carried through the pedestal to the sub-foundation and be continued to act as a support, or it may be shortened, as circumstances require or suggest.

It needs no special description to show that the same method and substantially the same apparatus may be used for erecting and supporting not only colossal statues, but also other structures, including bridges.

In Figs. 13 and 14 of the drawings the interior support of the statue or structure B is represented as consisting of a column or tube, E, of reduced cross dimensions, bound or supported externally by braces $a^2$, arranged to connect said tube with posts or uprights $a^3$, mounted on the base C of the pedestal, and also arranged to connect said posts with each other. The lower portion of the statue may be braced and connected with the interior support by diagonal braces $d$, as herein previously described.

In Figs. 15 and 16 of the drawings the pedestal or pier which forms the foundation for the statue or structure is represented as constructed of an outer close or solid wall, $d^2$, which is raised or built up as the statue is raised, and is strengthened internally by attached cross walls or piers $d^3$, arranged to leave an opening of the necessary capacity up within the central portion of the pedestal or pier foundation. In this case, instead of employing a single large or powerful lifting-jack for raising the statue or structure, a series of smaller jacks, distributed according to the weight of the statue, may be used.

Having thus described my invention, what I claim as new, and desire to secure by Letters Patent, is—

1. The combination, with the structure and its pedestal or pier foundation, of one or more sectionally-constructed metal columns or tubes arranged within the structure and projecting down within the foundation, and braces connecting the structure with said column or columns, substantially as specified.

2. The combination, with the structure to be raised, of the interior sectionally-constructed column, E, arranged with the structure, the pier foundation or pedestal C C', and the fixed jack I, applied centrally beneath said column, essentially as herein described.

3. The combination of one or more sectionally-constructed columns having certain of their sections provided with guides or projections $m$, with the rings $s$, having ways $n$, the hollow pedestal C C', and the structure B, to which said column or columns are secured internally, substantially as specified.

4. The combination of the stationary lifting jack or device I, the sectionally-constructed column or columns E, the hollow pedestal C C', the movable jacks D D, the structure B, and means for securing the column or columns E to said structure B, essentially as described.

5. The combination, with a hollow structure to be raised and its pedestal or pedestal-base, of a lifting-support applied to the structure, and constructed of a column, E, posts or uprights $a^3$, and braces $a^2$, arranged to connect said posts with each other and with the tube, substantially as specified.

JOHN C. GOODRIDGE, JR.

Witnesses:
M. A. GOODRIDGE,
C. L. ROLLINS.